R. McCORKELL.
MACHINE FOR MANGLING BEEFSTEAK AND OTHER MEATS.
No. 44,811.                  Patented Oct. 25, 1864.
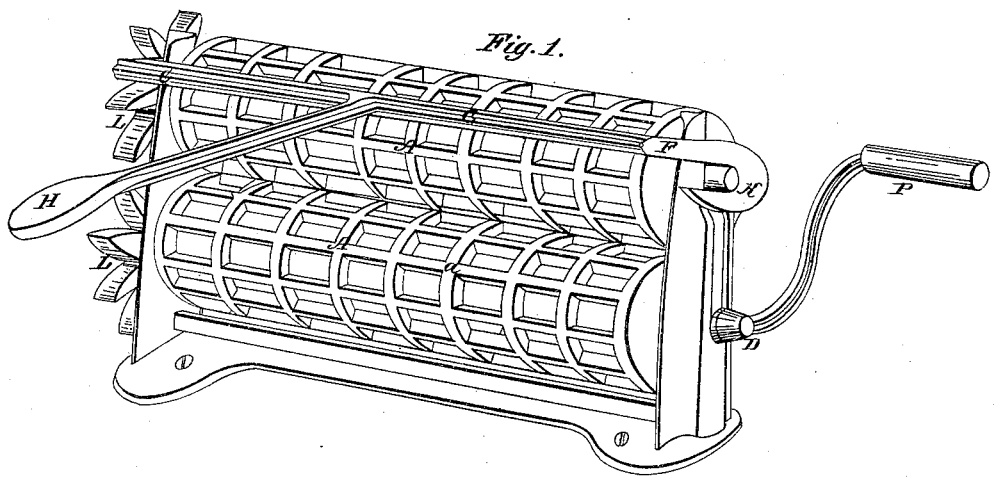
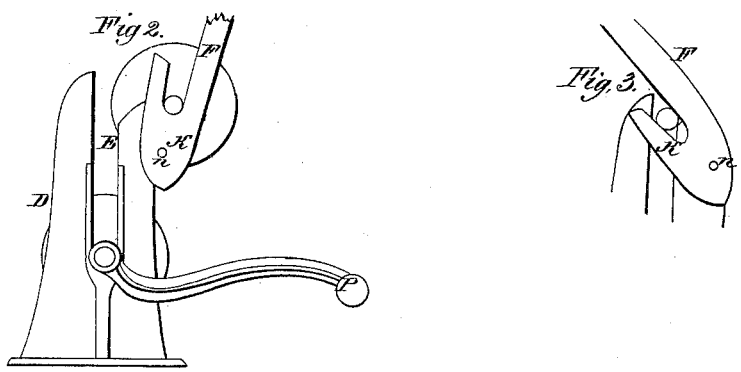
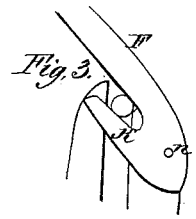
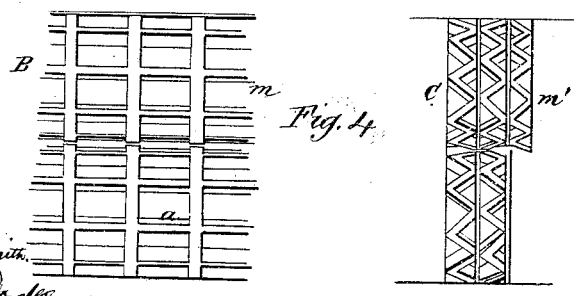
Witnesses.                  Inventor

UNITED STATES PATENT OFFICE.

ROBERT McCORKELL, OF WARSAW, MINNESOTA.

IMPROVED MACHINE FOR MANGLING BEEFSTEAK AND OTHER MEATS.

Specification forming part of Letters Patent No. 44,811, dated October 25, 1864; antedated October 18, 1864.

*To all whom it may concern:*

Be it known that I, ROBERT MCCORKELL, of the town of Warsaw, in the county of Goodhue and State of Minnesota, have invented a new and Improved Meat-Mangle; and I do hereby declare that the following is a full, clear, and exact description of the same, reference being had to the annexed drawings, making a part of this specification, in which—

Figure 1 is a perspective view; Fig. 2, an end elevation; Fig. 3, a section of lever, and Fig. 4 a view of a portion of rollers.

The nature of my invention consists in the construction of a machine for mangling beefsteak and other meats preparatory to cooking, with greater facility and ease and more equally than by any of the usual modes.

To enable others skilled in the art to make and use my invention, I will proceed to describe its construction and operation.

I construct a pair of rollers or cylinders, A, with ribs, ridges, or flanges a, running transversely, m, Fig. 4, or at angles, m'. I make these rollers B whole, or by placing a number of disks, C, on a journal or shaft, or in any convenient manner. I place these rollers in a frame, made in any common form, having two upright standards, D, with an open slot, E, in each, so that the rollers can be removed with ease to be cleaned or for any other purpose. The object of this slot is not only to allow the rollers to be taken out, but to allow the journals to work in such a way that the ribs may come in contact or work at any given distance apart, according to the thickness of the steak or other meat to be passed through them. The upper roller is held in position by means of two levers, F, fastened to the frame by bolts or rivets, n, so that they bear equally on both journals. These levers are united by a bar, G, running from one to the other, and are operated by the same handle, H. By means of these levers the rollers are brought together with any desired pressure, so as to break the fibers of the meat. This pressure is easily regulated to mangle a very tough or tender steak, whereas a spring will cut a tender steak, when it will not (without changing its elasticity) break the fibers of a tough one. Each of these levers has a hook or catch, k, coming under the journal, so as to lift the roller, to allow bones, fat, or any other part of the meat to pass through without being mangled and also to lift the roller out when desired. (See Fig. 2.)

The rollers are geared with cog-wheels L, so that the ribs, ridges, or flanges are brought opposite each other to break the fibers of the meat coming between them, while the part in the indentations or open spaces receives no pressure, and absorbs any juices that may be squeezed out by the ribs.

The machine is operated by means of a crank, P, fastened on the journal of one of the rollers.

The advantages of my machine are—the ease and facility with which the work can be done; the regularity with which the fibers of the meat are separated; the manner in which they are separated, being broken between the smooth faces of two ribs (and not cut, which does not make the meat any more tender;) the hand-lever by which the pressure can be suited to the different qualities of steak or the different parts of the same steak, (that having the firmest muscle needing the greatest pressure,) and the mode of mangling, so as to tender the meat without wasting its juices, thereby retaining its nutriment and flavor, which are lost by the usual modes of preparation.

I claim—

1. The construction of rollers having ridges and depressions, as described and arranged, in relation to each other, in such a manner that the ridges and depressions shall come opposite to or near upon each other, for the purpose specified.

2. The handle H and bar G, with the levers F F and hooks K, for the purpose set forth, substantially as described.

ROBERT McCORKELL.

Witnesses:
W. C. DODGE,
R. D. O. SMITH.